United States Patent [19]
Haikawa et al.

[11] Patent Number: 5,442,598
[45] Date of Patent: Aug. 15, 1995

[54] INFORMATION REPRODUCTION APPARATUS WITH CONTROL MEANS FOR PLURAL TRACK KICKBACK OPERATION

[75] Inventors: Yukihiko Haikawa; Shigeki Tsuji, both of Higashihiroshima, Japan

[73] Assignee: Sharp Kabushiki Kaisha, Osaka, Japan

[21] Appl. No.: 114,349

[22] Filed: Sep. 1, 1993

[30] Foreign Application Priority Data

Oct. 14, 1992 [JP] Japan .................................. 4-275858

[51] Int. Cl.$^6$ .............................................. G11B 17/22
[52] U.S. Cl. .................................... 369/32; 369/44.28
[58] Field of Search ...................... 369/32, 83, 84, 48, 369/54, 59, 60, 33, 24, 44.28, 43; 360/72.2, 77.04, 78.04, 77.07

[56] References Cited

U.S. PATENT DOCUMENTS 5,220,545 6/1993 Tomimitsu ............................ 369/32

FOREIGN PATENT DOCUMENTS 3-34156 2/1991 Japan .
3-15941 8/1991 Japan .

*Primary Examiner*—Ali Neyzari
*Attorney, Agent, or Firm*—Nixon & Vanderhye

[57] ABSTRACT

Upon initiation of reproduction of data from a disc, the operation of writing into a buffer memory data reproduced from the disc and the operation of reading out data from the buffer memory are carried out in parallel because the buffer memory is first empty. When the data amount in the buffer memory becomes full, a pickup is kicked back from the last reproduction sector by n tracks corresponding to the data amount of L sectors and the data writing operation into the buffer memory is suspended. When the reproduction sector reaches a target sector, data writing is reinitiated, and data of L sectors is written continuously until the buffer memory becomes full.

14 Claims, 3 Drawing Sheets it fills up with the arbitrary amount of information. Therefore, the number of kick back operations of the reproduction unit can be reduced. As a result, consumed current power of the information reproduction apparatus is reduced. Furthermore, the load of the control unit can be reduced. Also, battery drive of a long time period is possible.

INFORMATION REPRODUCTION APPARATUS WITH CONTROL MEANS FOR PLURAL TRACK KICKBACK OPERATION

BACKGROUND OF THE INVENTION

1. Field of the Invention

The present invention relates to information reproduction apparatuses, and more particularly, to an information reproduction apparatus that reproduces information from a disc in which audio data is compressed and recorded such as an optical disc and a magneto-optical disc.

2. Description of the Background Art

A conventional information reproduction apparatus such as a magneto-optical disc apparatus reproduces audio data digital-recorded spirally on a disc at a constant linear velocity to write the same sequentially into a buffer memory. In parallel with the reproduction operation, the information reproduction apparatus provides audio by reading out data from the buffer memory at a rate lower than the data reproduction rate from the disc and applying D/A conversion to the read out data. Such an information reproduction apparatus is implemented so that, even if track jumping of the optical pickup (beam spot) occurs due to physical disturbance or the like, error output such as sound intermittence will not occur by utilizing the difference between the rate of reproducing data from a disc (data writing rate into a buffer memory) and the rate of reading out data from a buffer memory.

FIG. 5 is a graph showing the change in the amount of data in a buffer memory. If data having a compression ratio of 4 is written continuously into an empty memory, the memory will become full in 0.75 seconds. In this case, the memory will become empty in 3 seconds if only data readout is carried out continuously from the full state of the memory. When reading and writing are carried out in parallel, the memory will become full in 1 second.

In an information reproduction apparatus using the above-described buffer memory, no data is stored in the memory when reproduction of information from a disc is first initiated. By carrying out data writing and data reading to and from a memory simultaneously, the memory becomes full in 1 second. Then, data writing is suspended and only data reading is carried out. When an empty region is generated in the memory, data writing is immediately reinitiated, whereby data writing and reading are carried out in parallel. In such a manner, the data reading and writing operation is controlled so that the amount of data in the memory is approximately 100%, as shown in FIG. 5.

Control of a data reading and writing operation in a conventional information reproduction apparatus is set forth in the following. The current amount of data in the memory is detected when the reproduction sector (the position of pickup with respect to disc) comes to the target sector (the sector subsequent to the last sector already written into memory). If the memory is not full, data of the reproduction sector is stored into the memory and the target sector updated. If the memory is full, the reproduction sector is kicked back by a distance of one track. By repeating the above-described operation, the data amount in the memory is maintained at the level of substantially 100%.

Because a kick back of 1 track is carried out in the above-described conventional information reproduction apparatus, the amount of data written into the memory at one time is that of 1 sector. During one operation of writing data into the memory, a kick back of 1 track is carried out 3 times on the average. This means that a kick back must be carried out frequently, resulting in increase in consumed power. This will particularly reduce the life time of a battery in a battery-driven system. Furthermore, because current for kicking back must be supplied frequently, the load (work amount) of the control circuit is increased.

SUMMARY OF THE INVENTION

An object of the present invention is to provide an information reproduction apparatus that can have consumed power reduced at the time of reproduction.

Another object of the present invention is to provide an information reproduction apparatus that can reduce load of a control circuit.

A further object of the present invention is to provide an information reproduction apparatus that can realize battery drive of a long time period.

The above objects of the present invention can be achieved by an information reproduction apparatus including the following elements.

More specifically, an information reproduction apparatus according to the present invention includes a reproduction unit for reproducing at a first transfer rate information recorded on a recording medium, a memory for storing information reproduced by the reproduction unit, a readout unit for reading out at a second transfer rate lower than the first transfer rate stored information from the memory, and a control unit for controlling the reproduction unit and the memory to suspend storage of information from the reproduction unit into the memory, and to move back the reproduction position of the reproduction unit by a number of tracks corresponding to an arbitrary amount of information to trace a recording track when the amount of information stored in the memory exceeds a first predetermined amount, and to reinitiate storage of information from the reproduction unit into the memory when the reproduction unit arrives at a position where information is recorded subsequent to the last information stored in the memory.

In accordance with an information reproduction apparatus of the above-described elements, the control unit moves back the reproduction position of the reproduction unit by a number of tracks corresponding to an arbitrary information amount to trace a recording track when the information amount stored in the memory attains the first predetermined amount. At the same time, the control unit suspends storage of information from the reproduction unit into the memory, so that only readout operation is carried out in the memory. Therefore, the information amount in the memory is reduced. As a result, the information amount in the memory is decreased by the above-mentioned arbitrary information amount when the reproduction unit comes to the position where information subsequent to the last information already stored in the memory is recorded. Here, the control unit reinitiates storage of information from the reproduction unit into the memory, whereby the memory is supplied with the arbitrary amount of information.

Thus, an arbitrary amount of information can be supplied to the memory by moving back (kick back) the reproduction position of the reproduction unit just once. Therefore, the number of kick backs can be decreased significantly in comparison with a conventional case, and consumed power and load of a control unit can be reduced. The present invention is particularly advantageous in a battery-driven information reproduction apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An information reproduction apparatus according to an embodiment of the present invention is described hereinafter with reference to FIGS. 1-4.

Figure 1:
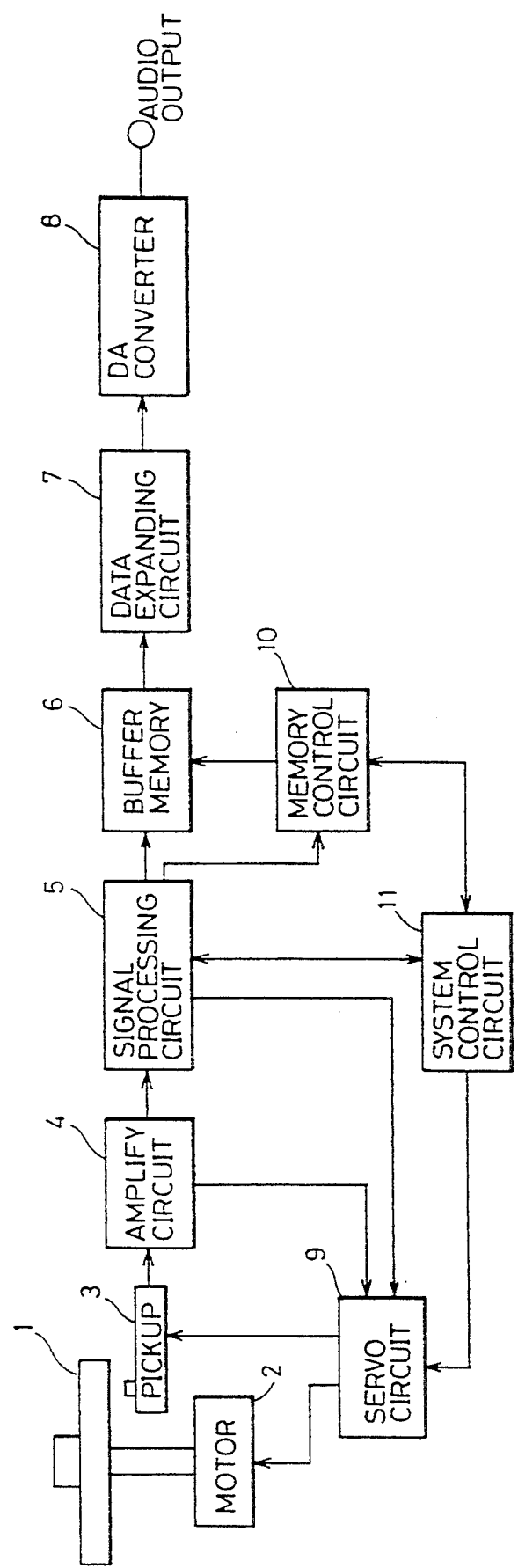
FIG. 1 is a block diagram showing a structure of an information reproduction apparatus according to an embodiment of the present invention.

Referring to FIG. 1, an information reproduction apparatus includes a disc 1 having data digital-recorded spirally, a motor 2 for rotating disc 1, and an optical pickup 3 for reading data stored in disc 1. Data read out from disc 1 includes compressed audio data, sector numbers indicating the order of music signals, and the like. The information reproduction apparatus further includes an amplify circuit 4, a signal processing circuit 5 for carrying out data error correction and extracting sector information, a buffer memory 6 to which error corrected data is written, a data expanding circuit 7 for expanding data read out from buffer memory 6, a D/A converter 8 for converting expanded data into an analog audio signal, a servo circuit 9 for controlling the position of the objective lens according to a signal indicating the position of the objective lens of pickup 3 from amplify circuit 4 and for controlling the number of frequency of motor 2 according to a signal indicating the rotation of frequency of the disc from signal processing circuit 5, a memory control circuit 10 for carrying out control or the like of writing and reading (sweep) data to and from buffer memory 6, and a system control circuit 11 generally formed of a microprocessor and a ROM (Read Only Memory). Memory control circuit 10 controls the data transfer rate so that data reading is carried out at a rate lower than the data writing rate (the data reading rate by pickup 3). System control circuit 11 controls memory control circuit 10 and servo circuit 9 by monitoring the sector number from signal processing circuit 5.

The operation of the information reproduction apparatus of the above structure will be described hereinafter.

Upon initiation of reproduction of disc 1 by pickup 3, the data read out from disc 1 by pickup 3 is processed by signal processing circuit 5 via amplify circuit 4, and then written into buffer memory 6 which is first empty. When a predetermined amount of data is written into buffer memory 6, readout of data from buffer memory 6 is carried out, whereby reading and writing are carried out simultaneously. The readout data is expanded by data expanding circuit 7, and then converted into, for example, an analog audio signal by D/A converter 8. The converted analog audio signal is provided as audio from a speaker or the like.

Figure 2:
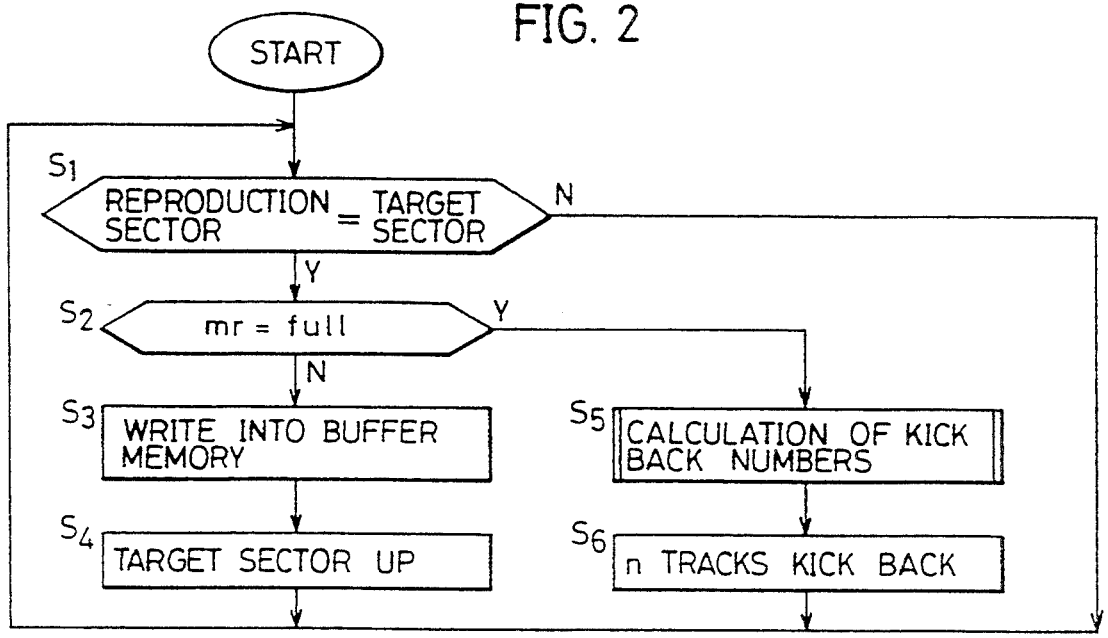
FIG. 2 is a flow chart for describing a writing operation into a memory in the information reproduction apparatus shown in FIG. 1.

The operation of writing data into buffer memory 6 will be described with reference to the flow chart of FIG. 2. Referring to FIG. 2, the reproduction sector implies the sector which is reproduced by pickup 3. The reproduction sector is determined by address information obtained by system control circuit 11 from signal processing circuit 5. The target sector implies the sector which is to be written into buffer memory 6, i.e. the sector subsequent to the last sector already written into buffer memory 6. mr indicates the remaining data amount in buffer memory 6, i.e. the amount of data written into buffer memory 6 and not yet read out therefrom.

At step S1, determination is made whether the reproduction sector is the target sector. If YES, determination is made whether buffer memory 6 is full or not at step S2. Because buffer memory 6 is empty when reproduction is initiated, the data of the reproduction sector is written into buffer memory 6 (step S3), followed by update of the target sector (step S4). This operation is repeated until buffer memory 6 is full.

If data writing and data reading are carried out in parallel at a data transfer rate similar to that of a conventional case, buffer memory 6 will become full in 1 second from the start of a reproduction operation.

According to the present invention, when the amount of data in buffer memory 6 is full, determination is made that the remaining data amount mr is rendered full at step S2, whereby the control proceeds to step S5.

At step S5, calculation of the number of kick backs n is carried out. This process includes the following process shown in FIG. 3.

Figure 3:
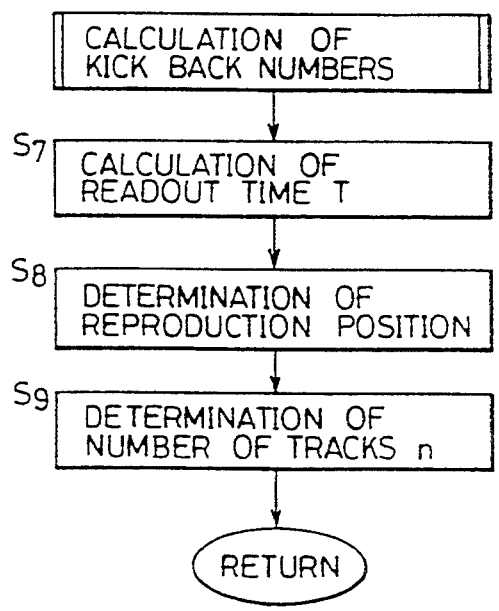
FIG. 3 is a flow chart for describing a subroutine to calculate the number of kick backs shown in FIG. 2.

Referring to FIG. 3, system control circuit 11 calculates a readout time T of buffer memory 6 corresponding to an amount of data of L sectors at step S7. Assuming that the data transfer rate by pickup 3 into buffer memory 6 is M (sectors/second) and the data compression ratio is 4, for example, the transfer rate of data from buffer memory 6 is M/4 (sectors/second). Therefore, the readout time T becomes 4L/M (seconds). An arbitrary value can be selected for L, and stored in advance in a ROM of system control circuit 11, for example. In this case, L and M are constants, with the readout time T also taking a constant value. Therefore, T may be stored in ROM instead of L. Alternatively, L may be a variable according to the environment of the apparatus, for example the level of disturbance or the like, and the readout time T calculated according to the above-described calculation method.

At step S8, system control circuit 11 determines the reproduction position of pickup 3 with respect to disc 1. The reproduction position is determined according to address information recorded on disc 1, as in step S1. More specifically, an address signal reproduced by pickup 3 is amplified to a predetermined amplitude by amplify circuit 4. The amplified address signal is subjected to a predetermined signal process by signal processing circuit 5 to be converted into the former address information. The converted address information is provided to system control circuit 11. The reason why the reproduction position is to be determined is due to the fact that the number of tracks corresponding to the readout time T differs between the inner circumference and the outer circumference of disc 1 when data is reproduced from disc 1 at a constant linear velocity. Next, at step S9, system control circuit 11 determines the number of tracks n corresponding to the readout time T. System control circuit 11 stores in advance a reference table in ROM for determining the number of tracks n. The reference table includes data of the number of tracks n corresponding to a readout time T for each reproduction position. System control circuit 11 reads out from the reference table data of the number of tracks n corresponding to the readout time T calculated at step S7 and the reproduction position determined at step S8. Thus, the number of tracks n is determined. This number of tracks n is the number of kick backs n by which the reproduction position of pickup 3 is moved back.

Referring to FIG. 2 again, the kick back of n tracks is carried out at step S6.

Thus, system control circuit 11 controls servo circuit 9 to kick back pickup 3, whereby the reproduction position is moved back by n tracks from the last reading position, i.e. the last written sector. System control circuit 11 effects tracing (empty reading) from the returned position and controls memory control circuit 10 to suspend writing data into buffer memory 6. Although signal processing circuit 5 operates to transfer the address information of the reproduction sector into system control circuit 11 in this event, the operation of data transfer to buffer memory 6 is not carried out.

According to the above-described kick back operation, the time required for pickup 3 to return to the former reproduction position coincides with the time period T for data of L sectors to be read out from buffer memory 6.

At step S1, system control circuit 11 makes determination whether the number of the reproduction sector transferred from signal control circuit 5 matches the number of the target sector. If the number matches, the operation of writing data into buffer memory 6 is suspended. It is to be noted that the data readout operation from buffer memory 6 is still carried out.

When the reproduction sector matches the target sector (YES at step S1), system control circuit 11 transfers data of the reproduction sector from signal processing circuit 5 into buffer memory 6, and also controls memory control circuit 10 to reinitiate data writing into buffer memory 6 (S3). The operation of steps S1–S4 is repeated until buffer memory 6 becomes full. Data of L sectors is written continuously into buffer memory 6. When buffer memory 6 becomes full again, the operation of steps S5–S6 is repeated. System control circuit 11 controls servo circuit 9 to kick back pickup 3 by n tracks. Pickup 3 initiates tracing from the returned position, and writing data into buffer memory 6 is suspended. Then, the above-described operation is repeated.

Figure 4:
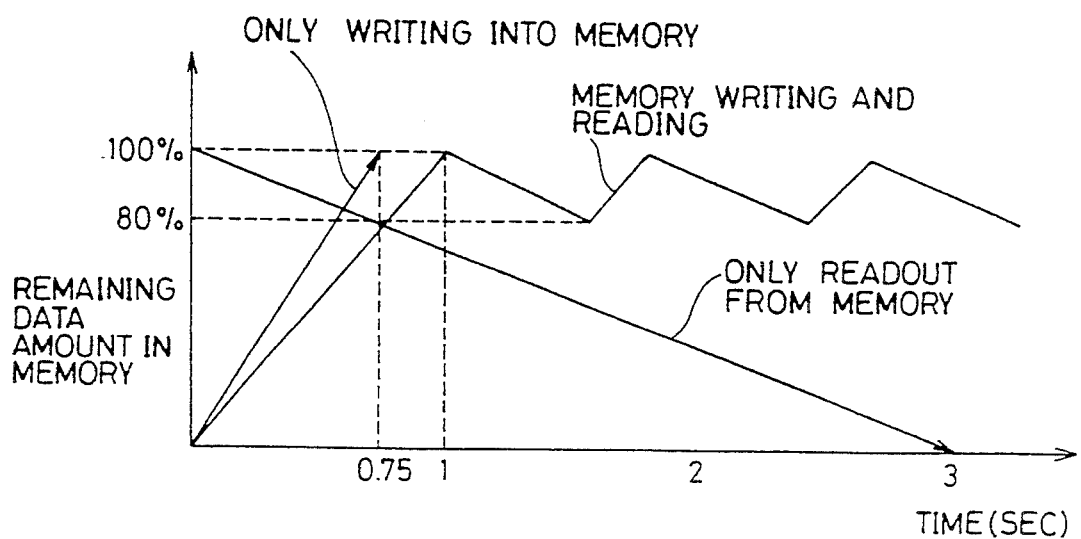
FIG. 4 is a diagram showing change in the amount of data in the memory of the information reproduction apparatus of FIG. 1.
Figure 5:
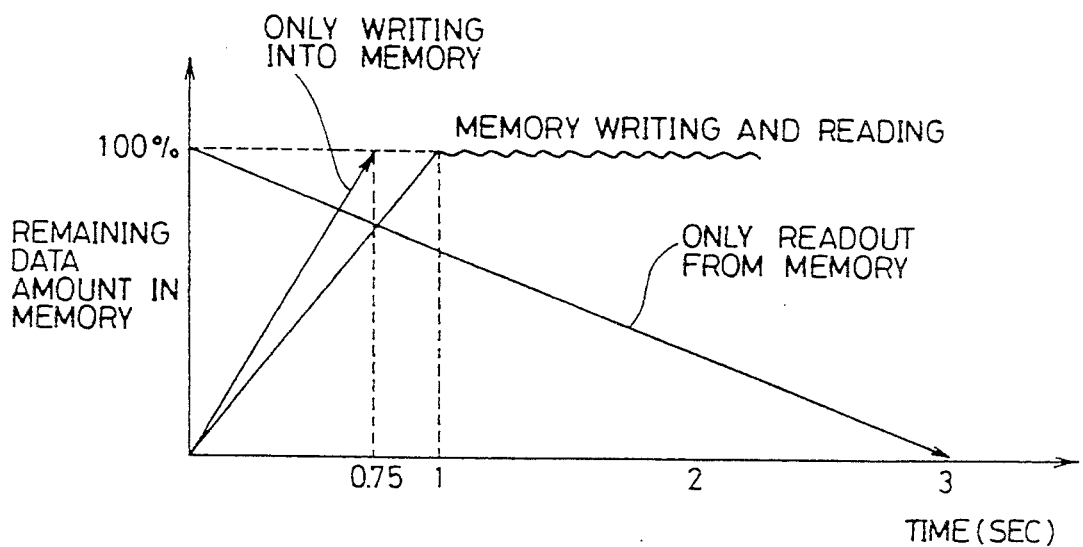
FIG. 5 is a diagram showing change in the amount of data in the memory of a conventional information reproduction apparatus.

FIG. 4 shows the change in the remaining data amount when the number of tracks n to be kicked back is set such that the remaining data amount in buffer memory 6 is, for example, 80%. The data amount will vary within the range of 100-80%.

By the above-described operation, an arbitrary amount of data can be supplied to buffer memory 6 by one kick back. Therefore, the information reproduction apparatus of the present embodiment can have the number of kick backs reduced significantly in comparison with that of a conventional information reproduction apparatus. Reduction in the number of kick backs will realize reduction of consumed power. An actuator provided in pickup 3 is generally a linear motor type actuator formed of coils, magnets, or the like. A linear motor type actuator has low driving loss of friction, so that practically all the power is consumed at the time of acceleration and deceleration of the actuator. This means that consumed power depends upon the number of kick backs, and not the amount of movement of the actuator. Therefore, consumed power of the entire apparatus can be reduced significantly by minimizing the number of kick backs as described above. The load of servo circuit 6 can also be alleviated. In an information reproduction apparatus that supplies power to the main body of the apparatus using a portable power supplying unit such as a battery, long time usage can be achieved to improve its practical usage.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information reproduction apparatus for reproducing information recorded on a recording track of a recording medium, comprising:
reproduction means for reproducing at a first transfer rate information recorded on said recording medium by tracing said recording medium,
memory means for storing information reproduced by said reproduction means,
readout means for reading out stored information from said memory means at a second transfer rate lower than said first transfer rate, and
control means for controlling said reproduction means and said memory means such that
when the amount of information stored in said memory means exceeds a predetermined value, storage of information from said reproduction means into said memory means is suspended and the reproduction position of said reproduction means is moved back by a plurality of tracks at once with the number of tracks corresponding to an information amount to trace said recording track, and
when said reproduction means arrives at a position where information subsequent to the last information stored in said memory means is recorded, storage of information from said reproduction means to said storage means is reinitiated.

2. The information reproduction apparatus according to claim 1, wherein said recording medium comprises a plurality of sectors in which said information is recorded in a divided manner.

3. The information reproduction apparatus according to claim 2, wherein said information amount corresponding to the number of tracks by which the reproduction position of said reproduction means is moved back by said control means is in the unit of said sector.

4. The information reproduction apparatus according to claim 3, wherein said control means stores information recorded in a plurality of said sectors in reinitiating storage of information from said reproduction means into said memory means.

5. The information reproduction apparatus according to claim 2, wherein said recording medium comprises identification information for identifying said sector.

6. The information reproduction apparatus according to claim 5, wherein said control means comprises reproduction position determination means for determining the reproduction position of said reproduction means by said identification information.

7. The information reproduction apparatus according to claim 6, wherein said control means comprises detection means for detecting that said reproduction means reaches the position where information subsequent to the last information stored in said memory means is recorded by comparing identification information of the sector including the last information stored in said memory means with identification information indicating the reproduction position of said reproduction means determined by said reproduction position determination means.

8. The information reproduction apparatus according to claim 1, wherein said control means comprises
   readout time determination means for determining the readout time required for reading out said information amount from said memory means, and
   number of tracks determination means for determining the number of tracks corresponding to said readout time.

9. The information reproduction apparatus according to claim 8, wherein said number of tracks determination means comprises a reference table defining the relationship between said readout time and said number of tracks corresponding to the reproduction position of said reproduction means for determining said number of tracks.

10. The information reproduction apparatus according to claim 1, further comprising portable power supplying means for supplying power to said information reproduction apparatus.

11. The information reproduction apparatus according to claim 1, wherein said predetermined value is the entire capacity of said memory means.

12. The information reproduction apparatus according to claim 1, wherein said reproduction means comprises a linear motor type actuator.

13. An information reproduction apparatus for reproducing information recorded on a recording track of a recording medium, comprising:
   reproduction means for reproducing at a first transfer rate information recorded on said recording medium,
   memory means for storing information reproduced by said reproduction means,
   readout means for reading out stored information from said memory means at a second transfer rate lower than said first transfer rate,
   first control means for controlling said memory means, so that said memory means carries out only readout of information when the information amount stored in said storage means exceeds a predetermined value, and, so that said memory means carries out storage and readout of information when the predetermined amount of information is readout from said memory means,
   estimation means for estimating a readout time period for said predetermined information amount to be read out, and
   second control means for controlling said reproduction means so as to carry out only one kick back within said readout time.

14. An information reproduction apparatus for reproducing information recorded in sector units on a recording track of a recording medium, comprising:
   reproduction means for reproducing at a first transfer rate information stored in said recording medium by tracing said recording medium,
   memory means for storing information reproduced by said reproduction means,
   readout means for reading out stored information from said memory means at a second transfer rate lower than said first transfer rate,
   control means for controlling said reproduction means and said memory means so that
   storage of information into said memory means is carried out in parallel with reading out information from said memory means, and when the information amount stored in said memory means exceeds a predetermined value, the reproduction position of said reproduction means is moved back by a plurality of tracks, at one time and storage of information into said memory means is suspended, and
   when the reproduction position of said reproduction means reaches the position where the information subsequent to the last information stored in said memory means is recorded, storage of information into said memory means is reinitiated to store information of a plurality of sectors into said memory means continuously.

* * * * *